No. 895,624. PATENTED AUG. 11, 1908.
M. GARLAND.
FRICTION CLUTCH.
APPLICATION FILED OCT. 17, 1907.
2 SHEETS—SHEET 1.
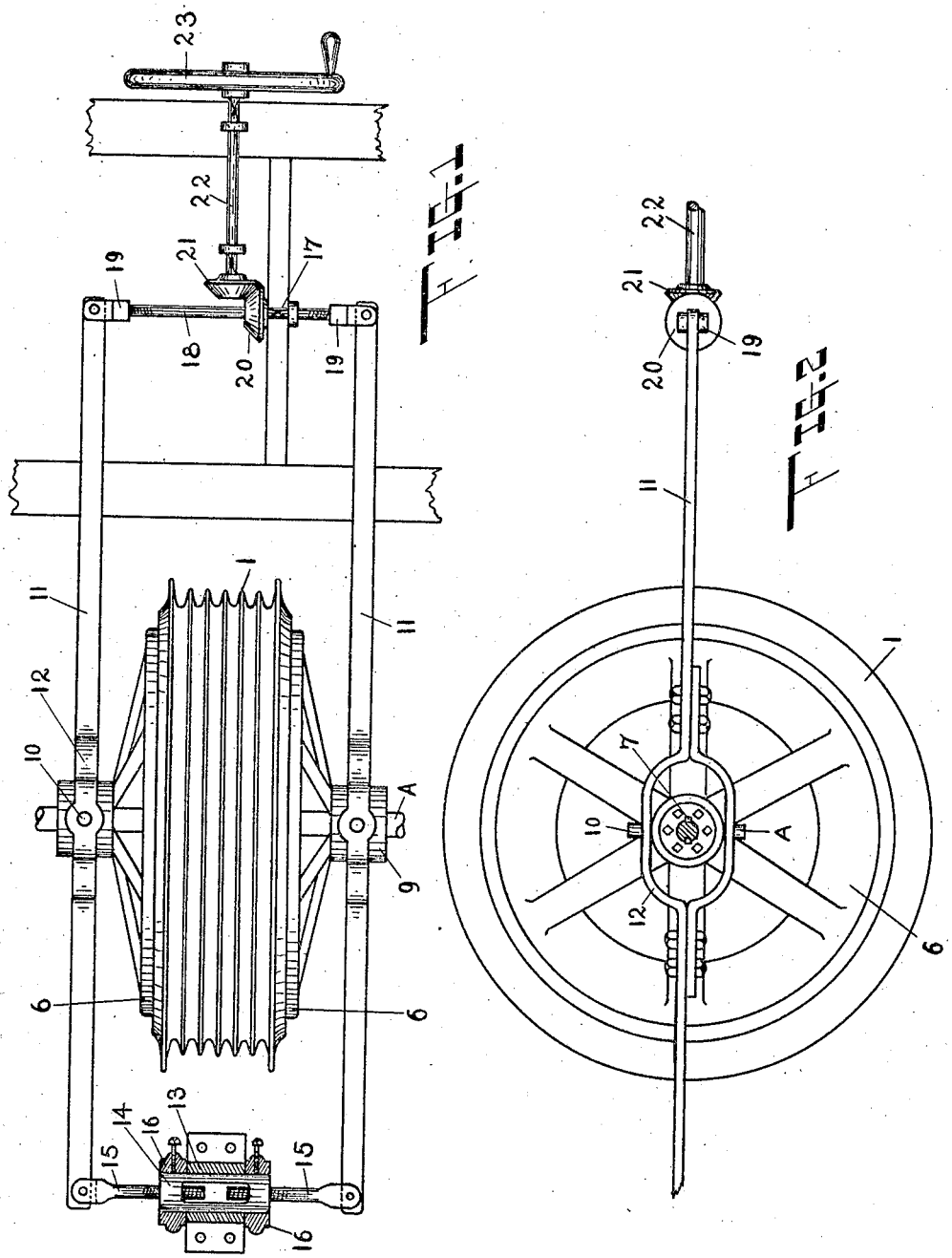
WITNESSES:
J. Ray Abbey
Ralph S. Warfield
INVENTOR
Michael Garland
BY
Geo. B. Willcox
ATTORNEY

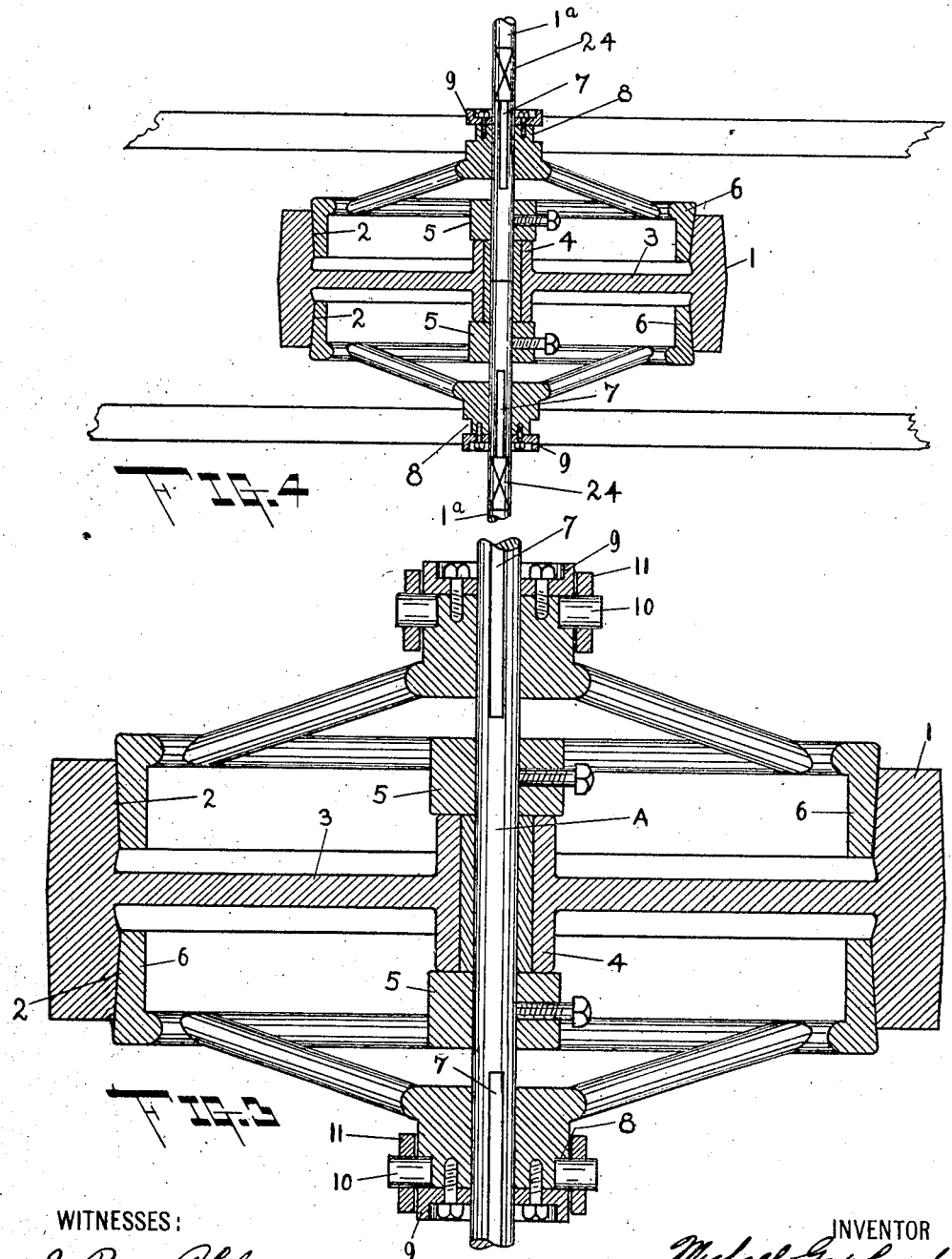

UNITED STATES PATENT OFFICE.

MICHAEL GARLAND, OF BAY CITY, MICHIGAN, ASSIGNOR TO THE M. GARLAND COMPANY, OF BAY CITY, MICHIGAN.

FRICTION-CLUTCH.

No. 895,624.      Specification of Letters Patent.      Patented Aug. 11, 1908.

Application filed October 17, 1907. Serial No. 397,813.

*To all whom it may concern:*

Be it known that I, MICHAEL GARLAND, a citizen of the United States, residing at Bay City, in the county of Bay and State of Michigan, have invented certain new and useful Improvements in Friction-Clutches; and I do hereby declare the following to be a full, clear, and exact description of the invention, such as will enable others skilled in the art to which it appertains to make and use the same.

My invention relates to friction clutches, one object of which is to provide a device capable of use in transmitting power from one shaft to another either parallel or in alinement therewith. In fact, my invention is capable of use in the same manner and to the same extent as any clutch, and in addition thereto is capable of use in connection with a pulley or sheave.

Another object of my invention is the provision of a clutching member which is adjustable relative to the driven element whereby to take up wear if any, and to vary the strength of the frictional clutching action. By means of such adjustment I can adapt my clutch to loads of different weights and at the same time obtain what practically amounts to an automatic release in case the load is greater than that which the power is capable of operating.

A further object of my invention is the provision of means for permitting the operator to control the clutching action.

A still further object is the provision of a clutch which will transmit power even though the bearing of the driven element of the clutch is worn or burned out.

With these and other objects in view, my invention consists in certain novel features and combinations such as will be more fully described hereinafter and particularly pointed out in the claims.

In the accompanying drawings, Figure 1 is a top plan view partly in section of one form of my invention; Fig. 2 is a view in side elevation showing the shifting lever and its connection to the clutching member; Fig. 3 is a cross-sectional view through the clutch showing the latter when adapted to a sheave or pulley; and Fig. 4 is a similar view showing the clutch adapted to transmit power from a driving to a driven shaft, the shafts arranged in alinement with each other.

It is observed that the clutch is useful in many different mechanisms, such as machinery in yards, factories, mills, or in motor vehicles, or wherever a clutch can be employed.

Referring to Figs. 1, 2 and 3, (A) indicates a suitably-supported drive or driven shaft. Loosely journaled on the shaft is a hollow member (1), the inner face of which, as shown, may be provided with two annular inclined surfaces (2) (2). The hollow cone member (1) is connected by means of spokes (3) or in any other convenient manner with a babbitted sleeve or hub (4) loosely journaled on the shaft (A), set collars (5) (5) located at opposite ends of the sleeve preventing endwise or lateral movement of the sleeve and of the hollow cone. It is obvious that the outer periphery of the cone may be plain, or it may be used as a crown-pulley, corrugated to constitute a rope sheave or toothed as for a sprocket.

In the drawings, I have shown two cones (6) (6), slidingly mounted on shaft (A) by means of the feathers (7) (7), the cones being located on opposite sides of the hollow member and adapted to coöperate with the interior inclined faces (2) (2) thereof. Plainly, one cone (6) and face (2) might be used except possibly in the construction shown in Fig. 4 where either shaft may be the drive shaft, or both may be driven shafts. However, the form herein shown is a double friction clutch and is adapted to equalize the strain on the moving parts and obviate twisting thereof. The outer ends of each hollow cone are reduced, caps (9) being suitably secured thereto, whereby the grooves (8) are formed, such grooves adapted to receive pins (10) carried by the shipping or shifting levers (11). These levers (11) are arranged substantially parallel with each other and project across the ends of the clutch, the levers being provided with eyes (12) which embrace the outer ends of the clutching cones, the eyes carrying the pins (10) which project into the grooves (8) of the cones. As one means for mounting these levers, whereby to permit an adjustment of the frictional contact between the hollow receiving clutch member and the sliding cones, I provide a suitably-mounted box (13) located centrally between the shipper levers adapted to receive a turn-buckle (14) sliding therein. Oppositely threaded rods (15) project from the turn-buckle, the outer ends of the rods being pivotally secured to the rear ends of the shipping levers (11). The turn-buckle (14) projects beyond the bearing (13) at each end, the projecting portions of the turn-buckle being provided with set collars (16) releasably secured to the turn-buckle and adapted to abut the ends of the bearing (13) to prevent movement of the turn-buckle.

It is obvious that by rotating the turn-buckle (14), the distance between the rear ends of the shipper levers (11) is increased or diminished, and in order that no longitudinal movement of the turn-buckle take place after its adjustment, the set-collars (16) are attached thereto and abut against the stationary bearing (13). Of course, a simultaneous adjustment of the rods and shipper levers may be obtained by merely releasing the set collars and moving the turn-buckle longitudinally relative to the box (13), such movement tending to bring the cones more or less closely to their respective coacting faces (2) (2). By means of the turn-buckle and rods and the set collars an absolutely exact adjustment of the shipper levers may be obtained.

As one means for operating the clutch mechanism, I may use the following arrangement of parts. Suitably mounted in a bearing (17) is a rotatable shaft (18), the ends of which are provided with right and left-hand threads respectively, such shaft extending transversely relative to the shipper levers and parallel with the axis of rotation of the clutch. To the forward ends of the shipper levers are pivotally secured the threading nuts (19) in which the respective threaded ends of the rotatable shaft (18) are received. The shaft also carries a gear (20) with which a gear (21) on an operator's shaft (22) meshes, the shaft (22) having a hand-wheel (23) or other operating device, whereby when the hand-wheel (23) is rotated in one direction or the other, motion is imparted to the rotatable shaft (18) to simultaneously spread the shipper levers apart whereby to release the hollow cone clutching element, or to draw the shipper levers together to cause the cones sliding on the shaft (A) to be inserted within the hollow cone member and frictionally engage the inclined faces (2). It is obvious that the operator can set the inter-acting clutch faces so that they will carry a load up to, but not pass the point of safety or breaking strain of the shaft (A), in other words, he may make a slip-coupling or he may lock the cones positively with the hollow clutching member. It will be noted that the hollow member may be the drive member and the shaft (A) the driven member, or vice versa, and that the hollow member may be a pulley or rope sheave to transmit motion from one shaft to another distant shaft.

In the slight modification shown in Fig. 4, I have illustrated the application of my clutch to a broken shaft or two shafts whose ends abut. In this view it will be observed that the respective alined shafts (1ª) (1ª) are each supported in bearings (24) (24) located outside of and adjacent the sliding cones (6) (6). In this arrangement either shaft (1ª) may be a driving shaft and the other a driven shaft or both may be driven shafts to which motion may be imparted by the hollow member (1). In Fig. 4, the shafts (1ª) (1ª) can not move longitudinally by reason of the bearings (24) (24), but are held in perfect alinement. The hollow member (1) in all views is adapted to rotate freely relative to the shaft (1) or the shafts (1ª) (1ª) when the cones (6) (6) are withdrawn, and the sleeve (4) to which the hollow member is attached is babbitted. In the event that this bushing should melt or burn out no particular harm would result, as the device could be run successfully even though the hollow member does not have a perfect bearing on the shaft.

The application of my invention either as a single or double friction clutch is universal where any clutch may be used, and as changes might be made in the form and arrangement of the several parts described I prefer not to limit myself to the exact construction shown.

Having thus fully disclosed my invention, what I claim as new is—

1. A double friction clutch comprising a shaft, a female clutch member carried by the shaft, male clutch members coöperating with the female member, a shipper lever for each male clutch member, adjustable means connecting the ends of the levers to vary the normal positions of the male members relative to the female member, and mechanism connecting the opposite ends of the levers for simultaneously actuating the male members toward or from the female member.

2. A double friction clutch comprising a shaft, male and female members, levers connected intermediate their ends with the respective male members, a suitable support, a turn-buckle releasably connected with the support, threaded rods, the threaded ends of which engage the turn-buckle, the ends of the levers being fulcrumed to the opposite ends of the rods, and means connecting the opposite ends of the levers for simultaneously moving them toward or away from each other.

3. A clutch mechanism comprising male and female members, the male members movable toward and from the female member, levers connected intermediate their ends to the respective male members, a longitudinally movable adjusting mechanism pivotally connecting the levers on one side of the clutch members, and means connecting the levers on the opposite side of the clutch mechanism for simultaneously moving the levers toward and from each other.

4. A clutch mechanism comprising a hollow member, cones slidably mounted relative thereto and coöperating therewith, shipper levers, the cones connected with the levers intermediate their ends, a stationary box located on one side of the clutch mechanism, a turn-buckle slidably received therein, means coöperating with the box for adjustably retaining the turn-buckle against longitudinal movement relative to the box, oppositely-projecting rods, the adjacent ends of which are threaded in the turn-buckle, the outer ends of the rods being pivotally connected to the respective levers, and means on the opposite side of the clutch mechanism for simultaneously moving the levers toward and from each other.

5. A clutch comprising a shaft, male and female members mounted on the shaft, levers connected intermediate their ends to the respective male members, a stationary supporting element, an adjusting member secured thereto and pivotally connected with the ends of the levers, and means connecting the opposite ends of the levers to move them simultaneously toward or away from the female member.

In testimony whereof, I affix my signature in presence of two witnesses.

MICHAEL GARLAND.

Witnesses:
L. G. SCHUESSLER,
JAMES VAN KLEECK.